United States Patent [19]

Peters et al.

[11] Patent Number: 4,872,343
[45] Date of Patent: Oct. 10, 1989

[54] MATCHED PAIRS OF FORCE TRANSDUCERS

[75] Inventors: Rex B. Peters, Woodinville; Craig J. Cornelius, Redmond, both of Wash.

[73] Assignee: Sundstrand Data Control, Inc., Redmond, Wash.

[21] Appl. No.: 230,791

[22] Filed: Aug. 10, 1988

[51] Int. Cl.$^4$ .................... G01P 15/08; G01P 15/10
[52] U.S. Cl. ............................ 73/517 AV; 73/862.59
[58] Field of Search ...... 73/517 AV, 862.59, DIG. 1; 177/210 FP

[56] References Cited

U.S. PATENT DOCUMENTS

| | | | |
|---|---|---|---|
| 3,529,470 | 5/1967 | Agar | 73/862.59 |
| 3,826,931 | 7/1974 | Hammond | 310/361 |
| 4,039,969 | 8/1977 | Martin | 310/361 |
| 4,144,747 | 3/1979 | Datwyler, Jr. | 73/862.59 |
| 4,215,570 | 8/1980 | Eer Nisse | 73/862.59 |
| 4,297,872 | 11/1981 | Ikeda et al. | 73/862.59 |
| 4,372,173 | 2/1983 | Eer Nisse et al. | 73/862.59 |
| 4,467,651 | 8/1984 | Peters et al. | 73/517 AV |
| 4,479,385 | 10/1984 | Koehler | 73/862.59 |
| 4,535,638 | 8/1985 | Eer Nisse et al. | 73/862.59 |
| 4,669,320 | 5/1987 | Simonsen | 73/862.59 |
| 4,718,275 | 1/1988 | Norling | 73/517 AV |
| 4,750,363 | 6/1988 | Norling | 73/517 AV |
| 4,766,768 | 8/1988 | Norling et al. | 73/517 AV |

Primary Examiner—Tom Noland
Assistant Examiner—Robert P. Bell
Attorney, Agent, or Firm—Michael S. Yatsko; Trevor B. Joike

[57] ABSTRACT

A matched pair of vibrating beam force transducers for use in an instrument such as an accelerometer, to provide enhanced linearity and common mode tracking, while decreasing the possibility of lock in or cross-talk between the transducers. In a preferred embodiment, first and second transducers are provided, the transducers producing respective first and second output signals having respective first and second frequencies. The transducers are connected in an arrangement in which for a given acceleration, one frequency increases and the other frequency decreases. The first transducer comprises a pair of first beams, and the second transducer comprises a pair of second beams. The beam dimensions are selected such that the Euler buckling constants of the first and second transducers are substantially equal to one another, and such that the first and second frequencies are different from one another when the acceleration is zero and preferably are different from one another throughout the operating range of the accelerometer. In preferred arrangements, the transducer beams have a constant thickness, and the transducers have common axial stiffnesses.

16 Claims, 1 Drawing Sheet

MATCHED PAIRS OF FORCE TRANSDUCERS

FIELD OF THE INVENTION

The present invention relates to force transducers. More particularly, the present invention relates to matched pairs of vibrating beam force transducers for use in accelerometers and in other instruments that rely on force measurements.

BACKGROUND OF THE INVENTION

Vibrating beam force transducers are often used as force-to-frequency converters in accelerometers and other instruments. In one known arrangement, the transducers are used in push-pull pairs in which a given acceleration or force will put one transducer in compression and the other in tension. This mode of operation provides a high degree of compensation for many common mode errors, i.e., errors that cause the frequencies of the transducers to shift by the same amount in the same direction, because the shifts cancel in the algorithms normally used to process the transducer outputs. Such errors include vibration rectification errors, changes induced by temperature change, most aging errors, and measurement errors induced by a drift in the clock frequency.

To obtain a high rejection of common mode errors, a pair of force transducers should be as similar as possible to one another, so that their responses to error sources such as temperature change and aging are as similar as possible to one another. For example, when the transducers are fabricated from crystalline quartz, the transducers are often etched from adjacent positions on a quartz wafer. However, when two transducers are used on a common structure, e.g., two transducers attached to a single accelerometer proof mass, another consideration intrudes. When the transducers are well matched, there will be conditions within the operating range of the instrument where both transducers vibrate at the same frequency, leading to the possibility of a "lock in" condition and a consequent local nonlinearity that may produce errors in the output of the instrument.

SUMMARY OF THE INVENTION

The present invention provides a matched pair of vibrating beam force transducers for use in an instrument such as an accelerometer. The transducers provide enhanced linearity and common mode tracking, while decreasing the possibility of lock-in or cross-talk between the transducers.

In a preferred embodiment, first and second vibrating beam force transducers are provided, the transducers producing respective first and second output signals having respective first and second frequencies. The transducers are for use in an instrument for measuring an input parameter, and are connected in the instrument in an arrangement in which for a given parameter change, one frequency increases and the other frequency decreases. The first transducer comprises a pair of first beams, and the second transducer comprises a pair of second beams. The beam dimensions are selected such that the Euler buckling constants of the first and second transducers are substantially equal to one another, and such that the first and second frequencies are different from one another when the parameter has a null value, and preferably throughout the operating range of the instrument.

The beams may be rectangular, with each first beam having a length $m_1$, a width $w_1$, and a thickness $t_1$, and each second beam having a length $m_2$, a width $w_2$, and a thickness $t_2$. In one embodiment, these dimensions may be selected such that $$m_2 = m_1(1+\epsilon)^{-\frac{1}{2}} \cdot (t_2/t_1)^{-\frac{1}{2}}$$

and $$w_2 = w_1(1+\epsilon)^{-\frac{1}{2}} \cdot (t_2/t_1)^{-\frac{1}{2}}$$

$\epsilon$ being a non-zero parameter that may be selected such that the first and second frequencies are not equal to one another within the operating range. A preferred embodiment is one in which $t_1$ is equal to $t_2$, such that the transducers can be crystal transducers etched from a common wafer. For all of the above described embodiments, the transducers may include end portions that are dimensioned such that the axial stiffnesses of the transducers are substantially equal to one another. In a further preferred arrangement, the beam dimensions are selected as follows:

$$m_2 = m_1(1+\epsilon)^{-\frac{2}{3}}$$

$$w_2 = w_1(1+\epsilon)^{-\frac{1}{3}}$$

and $$t_2 = t_1(1+\epsilon)^{-\frac{1}{3}}$$

In this arrangement, the axial stiffnesses of the first and second transducers are equal to one another, and the parameter $\epsilon$ may be selected such that the first and second frequencies are not equal to one another within the operating range.

DETAILED DESCRIPTION OF THE INVENTION

Figure 1:
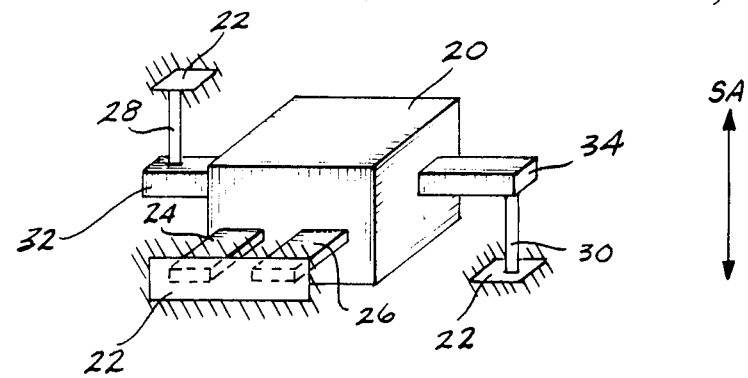
FIG. 1 is a schematic view of an accelerometer in which two force transducers are connected to a common proof mass.

The present invention provides a matched pair of double-ended tuning fork vibrating beam transducers. The matched pair may be used in an instrument of the type in which, in response to a sensed parameter, the frequency of the output signal of one of the transducers increases, while the frequency of the output signal of the other transducer decreases. An example of such an instrument is an accelerometer of the type illustrated in schematic fashion in FIG. 1. The accelerometer comprises proof mass 20 mounted to housing 22 by flexures 24 and 26. Force transducers 28 and 30 are connected between housing 22 and the proof mass through arms 32 and 34, such that the force transducers are parallel to sensing axis SA. Arms 32 and 34 are included in FIG. 1 primarily for purposes of illustration, and in many cases accelerometers of this type will not include corresponding structural elements.

Each force transducer may comprise a quartz crystal having the double-ended tuning fork construction illustrated in U.S. Pat. No. 4,215,570. Such a crystal, in combination with a suitable drive circuit, comprises an oscillator that has a resonant frequency that is a function of the axial force along the crystal. The oscillator functions as a force transducer in which a compression force along the transducer produces a decrease in the resonant frequency, and a tension force along the transducer results in an increase in the resonant frequency. Therefore by connecting the transducer output signal to a suitable frequency measurement circuit, the force exerted on the transducer can be determined.

In the accelerometer of FIG. 1, an acceleration along sensing axis SA will result in a compression force on one transducer and a tension force on the other transducer. The result will be that the frequency of the output signal of one force transducer will decrease, and the frequency of the output signal of the other force transducer will increase. The acceleration G may then be determined by means of a differential relationship such as:

$$G = W_1 f_1 - W_2 f_2 + W_0 \tag{1}$$

where $f_1$ and $f_2$ are the output signal frequencies of the two force transducers, and where $W_1$, $W_2$ and $W_0$ are constants determined through calibration procedures. More complex differential relationships between output signal frequencies and acceleration may also be used.

In Equation (1), constants $W_1$ and $W_2$ represent the sensitivities of the respective transducers, and constant $W_0$ represents the bias or offset of the accelerometer. Since the transducers are preferably as similar as possible to one another, $W_1$ is typically nearly equal to $W_2$. Suitable systems for determining acceleration using Equation (1) are set forth in U.S. Pat. No. 4,467,651. By using a differential relationship to determine acceleration, frequency changes caused by thermal expansion, most aging errors and clock frequency errors will tend to cancel, and therefore will not cause significant errors in the measured acceleration.

Another factor that should be taken in account when two force transducers are connected to a single proof mass is transducer axial stiffness. The axial stiffness of a transducer is equal to the force applied to the transducer along the sensing axis divided by the resulting change of length of the transducer. Preferably, the product of the stiffness of each transducer multiplied by the distance between the center of mass of the proof mass and the connection point of the transducer to the proof mass is the same for both transducers. If such products are not the same, then the proof mass will tend to rotate in response to an acceleration along the sensing axis, creating a cross coupling term that can introduce errors in the accelerometer output. For most applications, it will be desirable to locate the center of gravity of the proof means midway between the force transducer connection points. In such an arrangement, the stiffnesses of the transducers should therefore be equal to one another.

The present invention provides a matched pair of double-ended tuning fork force transducers that may advantageously be used in an accelerometer such as the one shown in FIG. 1, and in other instruments in which two or more force transducers are connected to a common structure, and/or in an arrangement in which a given sensed parameter increases one output signal frequency while decreasing the other. In particular, the transducers may be made to have null input (i.e., zero acceleration) frequencies separated from one another by an amount sufficient to prevent cross-talk or lock in, while still retaining the form of frequency tracking that permits the rejection of common mode errors. In certain embodiments, the transducers are dimensioned such that they can be etched from adjacent positions on a common crystal wafer. An addition feature of the invention is the ability to retain matched axial stiffness between the two transducers, for applications where that added degree of matching produces a simpler or better behaved dynamic response.

Consider two double-ended tuning fork vibrating beam force transducers, for use in an accelerometer, that can be characterized by the following models $$f_1 = f_{01} + K_{11}g + K_{11}K_{21}g^2 \tag{2}$$

$$f_2 = f_{02} - K_{12}g + K_{12}K_{22}g^2 \tag{3}$$

where $f_1$ and $f_2$ are the frequencies of the output signals, $f_{01}$ and $f_{02}$ are the zero-acceleration frequencies, the K parameters are constants, and g is the input acceleration. These models can be combined with an algorithm of the form of Equation (1) above, to produce the following expression for the measured acceleration G:

$$G = [W_1 f_{01} - W_2 f_{02} - W_0] + [W_1 K_{11} + W_2 K_{12}] g + [W_1 K_{11} K_{21} - W_2 K_{12} K_{22}] g^2 \tag{4}$$

In order to have G equal to g, Equation (4) requires, among other things, that $$\frac{W_1}{W_2} = \frac{K_{12} K_{22}}{K_{11} K_{21}} \tag{5}$$

so that the $g^2$ term vanishes in Equation (4).

Now suppose that $g=0$, but that $f_{01}$ and $f_{02}$ undergo a proportional change in value, i.e., $f_{01}$ and $f_{02}$ shift to $f_{01}'$ and $f_{02}'$ as follows:

$$f_{01}' = f_{01}(1+\epsilon) \tag{6}$$

$$f_{02}' = f_{02}(1+\epsilon) \tag{7}$$

These shifts are the kind produced by clock frequency changes ($\epsilon = \Delta f_c/f_c$), and by many forms of aging. For crystal transducers that come from a common wafer and that therefore have the same orientation of crystal axes, it is also the kind of change that arises from a change in temperature. For such a shift to cause no bias error, it is necessary that $$W_1 f_{01} - W_2 f_{02} = W_1 f_{01}(1+\epsilon) - W_2 f_{02}(1+\epsilon) \tag{8}$$

which reduces to the condition that $$\frac{W_1}{W_2} = \frac{f_{02}}{f_{01}} \tag{9}$$

To satisfy Equations (5) and (9) simultaneously, it is necessary that $$\frac{f_{02}}{f_{01}} = \frac{k_{12} k_{22}}{k_{11} k_{21}} \tag{10}$$

For vibrating beam transducers that fit the model $$G = C\left[1 - \left(\frac{f}{f_0}\right)^2\right] \cdot \left[1 - D\left[1 - \left(\frac{f}{f_0}\right)^2\right]\right] \tag{11}$$

it can be shown that $$k_1 = \frac{f_0}{2C} \qquad (12)$$

$$k_2 = \frac{1 + 4D}{4C} \qquad (13)$$

where C is the Euler buckling load corresponding to the mode of displacement used in the vibrating beam. Combining Equations (10), (12) and (13), one obtains $$\frac{C_1^2}{C_2^2} = \frac{1 + 4D_1}{1 + 4D_2} \qquad (14)$$

Since the D values are small compared to unity, and nearly the same for all transducers of a given general class, the two criteria of good linearity and good common mode rejection can be satisfied simultaneously if $$C_1 = C_2 \qquad (15)$$

The behavior of the beams in a vibrating beam force-to-frequency transducer closely approximates that of ideal built-in/built-in classical beams. For such beams $$f_0 = \frac{70}{m^2}\sqrt{\frac{EI}{Ap}} \qquad (16)$$

$$C = \frac{4\pi^2 \times EI}{m^2} \qquad (17)$$

$$k = \frac{EA}{m} \qquad (18)$$

where m is the beam length, E is the modulus of elasticity, I is the area moment of inertia of the beam cross section, A is the cross-sectional area of the beam, p is the weight density, and k is the axial stiffness of the beam.

Figure 2:
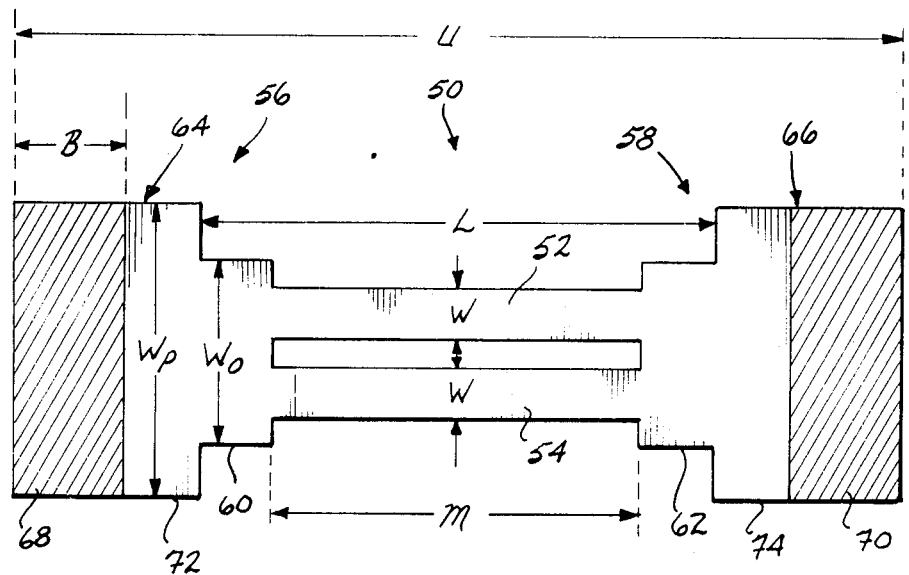
FIG. 2 is a schematic view of a double-ended tuning fork vibrating beam force transducer.

FIG. 2 sets forth, in schematic form, a double-ended tuning fork force transducer of the type described, for example, in U.S. Pat. No. 4,372,173. Transducer 50 includes beams 52 and 54 that extend between a pair of end portions 56 and 58. End portions 56 and 58 respectively comprise outriggers 60 and 62 each of which is connected to both beams, and mounting pads 64 and 66 connected to the respective outriggers. Beams 52 and 54 have length m and width w. The thickness of the beams, designated t below, extends normal to the figure and is not illustrated. When built into an instrument such as an accelerometer, mounting pads 64 and 66 include portions 68 and 70 that are secured, such as by adhesive, to other components of the instrument, and free portions 72 and 74 that are not connected to the instrument, except through portions 68 and 70. The length of portion 68 and 70 is designated B. Other dimensions shown in FIG. 2 include length L of the beams plus outriggers, and widths $w_p$ and $w_o$ for the mounting pads and outriggers, respectively.

For a force transducer of the type shown in FIG. 2, or for any force transducer having beams with rectangular cross sections, Equations (16) through (18) may be used to determine that:

$f_0$ is proportional to $w/m^2$ \qquad (19)

C is proportional to $tw^3/m^2$ \qquad (20)

k is proportional to $tw/m$ \qquad (21)

If the thicknesses of the beams are not required to be equal to one another, there are enough variables to change $f_0$ while holding C and k constant. In particular, for $f_{02}$ to be equal to $f_{01}(1+\epsilon)$, the solutions are:

$$m_2 = m_1(1+\epsilon)^{-\frac{2}{3}} \qquad (22)$$

$$w_2 = w_1(1+\epsilon)^{-\frac{1}{3}} \qquad (23)$$

$$t_2 = t_1(1+\epsilon)^{-\frac{1}{3}} \qquad (24)$$

Equations (22)–(24) thus represent the dimensions that will cause the zero-acceleration frequencies of the transducers to differ from one another, by an amount specified by $\epsilon$, while preserving linearity and common mode rejection ($C_1 = C_2$) and matched axial stiffness ($k_1 = k_2$). By suitable selection of the parameter $\epsilon$, the transducers can be designed such that their frequencies are not equal to one another within the operating range of the instrument in which the transducers are used.

A solution that will often be more practical than the one represented by Equations (22)–(24) is one in which thickness t is fixed, such that $t_1 = t_2$, thus allowing (for example) the use of quartz transducers that have been etched from side-by-side positions on a common wafer. In this embodiment, the solutions corresponding to Equations (22)–(24) are $$m_2 = m_1(1+\epsilon)^{-\frac{3}{4}} \qquad (25)$$

$$w_2 = w_1(1+\epsilon)^{-\frac{1}{2}} \qquad (26)$$

$$k_2 = k_1(1+\epsilon)^{\frac{1}{4}} \qquad (27)$$

For example, if $f_{01}$ were to be equal to 35 kHz and $f_{02}$ were to be 45 kHz, such that $1+\epsilon$ was equal to 45/35 or 1.2857, then these equations result in the following relationships for the beam dimensions $$m_2 = m_1 \cdot 0.8282 \qquad (28)$$

$$w_2 = w_1 \cdot 0.8819 \qquad (29)$$

$$t_2 = t_1 \qquad (30)$$

In accordance with equation (18), these relationships between beam dimensions result in the following relationship between the axial stiffnesses of the transducer beams $$k_2 = k_1 \cdot 1.065 \qquad (31)$$

The 6.5% shift in the axial stiffnesses of the beams can be compensated by adjusting the lengths (and therefore the stiffnesses) of the outriggers, as described below.

In a third embodiment of the invention, both k (for the beams) and t are allowed to differ as between the two transducers, while maintaining equal Euler buckling constants $C_1$ and $C_2$ and non-overlapping frequency ranges. This solution is as follows:

$$m_2 = m_1(1+\epsilon)^{-\frac{3}{4}} \cdot (t_2/t_1)^{-\frac{1}{4}} \qquad (32)$$

$$w_2 = w_1(1+\epsilon)^{-\frac{1}{2}} \cdot (t_2/t_1)^{-\frac{1}{2}} \qquad (33)$$

$$k_2 = k_1(1+\epsilon)^{\frac{1}{4}} \cdot (t_2/t_1)^{\frac{3}{4}} \qquad (34)$$

For given values of $w_1$, $m_1$ and $\epsilon$, Equations (32)–(34) give a family of $w_2$, $m_2$ and $k_2/k_1$ values depending upon the ratio of $t_2/t_1$. By setting $t_2$ equal to $t_1$, it may be seen that Equations (25)–(27) are a special case of Equations (32)–(34).

In the embodiment described above by Equations (28) through (31), wherein $t_1$ is equal to $t_2$ and $k_1$ and $k_2$ differ, it is possible to compensate for the difference in beam axial stiffness by adjusting the lengths of the outriggers with respect to the lengths of the beams, so that the axial stiffnesses of the transducers as a whole are equal to one another. In particular, referring to FIG. 2, the overall axial stiffness of the transducer can be approximated by the following relationship $$k = \frac{Et}{\frac{m}{2w} + \frac{L-m}{w_0} + \frac{U-L-2B}{w_p}} \quad (35)$$

where U is the overall length of the transducer, and $w_0$, $w_p$ and B are as shown in FIG. 2. It is desirable to keep U, $w_p$ and B constant, to facilitate transducer interchangeability in a given instrument design. To minimize axial pumping losses, $w_0$ may be made equal to about 3w. Allowing for these additional constraints, the change in beam stiffnesses introduced by differences in beam dimensions w and m can be compensated simply by changing length L, i.e., by making a compensating change in the lengths of the outriggers. In the example set forth above by Equations (28)–(31), the values for the ratios $t_1/w_1$ and $L_1/m_1$ are 0.86 and 1.16, respectively. The corresponding ratios of $t_2/w_2$ and $L_2/m_2$ are 0.98 and 1.30, respectively, where $L_2$ has been adjusted to keep k essentially constant. Comparison of these ratios with FIG. 3 of U.S. Pat. No. 4,372,173 indicates that these ratios define a pair of force transducers that are free of spurious vibration modes.

By way of summary, in one embodiment, the present invention provides a pair of transducers for which Equation (15) is satisfied, and for which the null input frequencies may be made different from one another so that the frequencies of the transducer output signals are not equal to one another within the operating range of the instrument in which the transducers are used. Non-overlapping frequency ranges are thus provided without sacrificing linearity or common mode rejection. This embodiment is represented by Equations (32)–(34). In this embodiment, neither the thicknesses nor the axial stiffnesses of the beams are required to be equal to one another. However, the axial stiffnesses of the transducers as a whole may be made equal to one another, for example by adjusting the lengths of the outriggers.

In a second embodiment, the present invention provides a pair of transducers for which Equation (15) is satisfied, for which the null input frequencies may be made sufficiently different from one another so that the frequencies of the transducer output signals are not equal to one another within the operating range of the instrument, and for which the axial stiffnesses of the beams are equal to one another. This embodiment is represented by Equations (22)–(24).

In a third embodiment, the present invention provides a pair of transducers for which Equation (15) is satisfied, for which the null input frequencies may be made sufficiently different from one another so that the frequencies of the transducer output signals are not equal to one another within the operating range of the instrument, and for which the beam thicknesses are equal to one another. This embodiment is represented by Equations (25)–(27). For this embodiment, the overall axial stiffnesses of the transducers may be made equal to one another, for example by adjusting the lengths of the outriggers. In general, this is the most preferred embodiment, inasmuch as it permits crystal transducers to be etched from the same wafer.

While the preferred embodiments of the invention have been described, variations will be apparent to those skilled in the art. Accordingly, the scope of the invention is to be determined by reference to the following claims.

The embodiments of the invention in which an exclusive property or privilege is claimed are defined as follows:

1. In an accelerometer of the type comprising first and second vibrating beam force transducers that produce respective first and second output signals having respective first and second frequencies, and that are connected in a push-pull arrangement in which for a given acceleration along a sensing axis, one frequency increases and the other frequency decreases, the first transducer comprising a pair of first beams and the second transducer comprising a pair of second beams, the improvement wherein the beam dimensions are selected such that the Euler buckling constants of the first and second transducers are substantially equal to one another, and such that in the absence of acceleration along the sensing axis, the first and second frequencies are different from one another.

2. The improvement of claim 1, wherein the beam dimensions are selected such that the first and second frequencies are not equal to one another within an operating range of the accelerometer.

3. The improvement of claim 2, wherein each first beam has a length $m_1$, a width $w_1$, and a thickness $t_1$ each second beam has a length $m_2$, a width $w_2$, and a thickness $t_2$, and wherein $$m_2 = m_1(1+\epsilon)^{-\frac{1}{4}} \cdot (t_2/t_1)^{-\frac{1}{4}}$$

and $$w_2 = w_1(1+\epsilon)^{-\frac{1}{4}} \cdot (t_2/t_1)^{-\frac{1}{4}}$$

$\epsilon$ being a non-zero parameter, whereby the parameter $\epsilon$ may be selected such that the first and second frequencies are not equal to one another within the operating range.

4. The improvement of claim 3, wherein $t_2$ equals $t_1$.

5. The improvement of any one of claims 1–4, wherein each transducer comprises end portions between which the beams of the transducer extend, and wherein the end portions of the transducers are dimensioned such that the axial stiffnesses of the transducers are substantially equal to one another.

6. The improvement of claim 5, wherein for each transducer, each end portion comprises an outrigger connected to both beams and a mounting pad connected to the outrigger, and wherein the dimensions of the outriggers are selected such that the axial stiffnesses of the transducers are substantially equal to one another.

7. The improvement of claim 6, wherein the lengths of the outriggers are selected such that the axial stiffnesses of the transducers are substantially equal to one another.

8. The improvement of claim 2, wherein each first beam has a length $m_1$, a width $w_1$, and a thickness $t_1$, each second beam has a length $m_2$, a width $w_2$, and a thickness $t_2$, and wherein $$m_2 = m_1(1+\epsilon)^{-2/3}$$

$$w_2 = w_1(1+\epsilon)^{-1/3}$$

and $$t_2 = t_1(1+\epsilon)^{-1/3}$$

$\epsilon$ being a non-zero parameter, whereby the axial stiffnesses of the first and second transducers are equal to one another, and whereby the parameter $\epsilon$ may be selected such that the first and second frequencies are not equal to one another within the operating range.

9. Matched first and second vibrating beam force transducers that produce respective first and second output signals having respective first and second frequencies, the transducers being for use in an instrument for measuring an input parameter, the instrument being of the type in which the transducers are connected in an arrangement in which for a given input parameter change, one frequency increases and the other frequency decreases, the first transducer comprising a pair of first beams and the second transducer comprising a pair of second beams, the beam dimensions being selected such that the Euler buckling constants of the first and second transducers are substantially equal to one another, and such that the first and second frequencies are different from one another when the input parameter has a null value.

10. The matched transducers of claim 9, wherein the beam dimensions are selected such that the first and second frequencies are not equal to one another within an operating range of the instrument.

11. The matched transducers of claim 10, wherein each first beam has length $m_1$, width $w_1$, and thickness $t_1$, each second beam have length $m_2$ with $w_2$ and thickness $t_2$, and wherein $$m_2 = m_1(1+\epsilon)^{-3/2} \cdot (t_2/t_1)^{-1/2}$$

and $$w_2 = w_1(1+\epsilon)^{-1} \cdot (t_2/t_1)^{-1/2}$$

$\epsilon$ being a non-zero parameter, whereby the parameter $\epsilon$ may be selected such that the first and second frequencies are not equal to one another within the operating range.

12. The matched transducers of claim 11, wherein $t_2$ equals $t_1$.

13. The matched transducers of claims 9–12, wherein each transducer comprises end portions between which the beams of the transducer extend, and wherein the end portions of the transducers are dimensioned such that the axial stiffnesses of the transducers are substantially equal to one another.

14. The matched transducers of claim 13, wherein for each transducer, each end portion comprises an outrigger connected to both beams and a mounting pad connected to the outrigger, and wherein the dimensions of the outriggers are selected such that the axial stiffnesses of the transducers are substantially equal to one another.

15. The matched transducers of claim 14, wherein the lengths of the outriggers are selected such that the axial stiffnesses of the transducers are substantially equal to one another.

16. The matched transducers of claim 10, wherein each first beam has a length $m_1$, a width $w_1$, and a thickness $t_1$, each second beam has a length $m_2$, a width $w_2$, and a thickness $t_2$, and wherein $$m_2 = m_1(1+\epsilon)^{-2/3}$$

$$w_2 = w_1(1+\epsilon)^{-1/3}$$

and $$t_2 = t_1(1+\epsilon)^{-1/3}$$

$\epsilon$ being a non-zero parameter, whereby the axial stiffnesses of the first and second transducers are equal to one another, and whereby the parameter $\epsilon$ may be selected such that the first and second frequencies are not equal to one another within the operating range.

* * * * *